July 15, 1969 A. ADEM 3,456,131
SEQUENTIAL FLASHER CIRCUITS
Filed Dec. 28, 1966
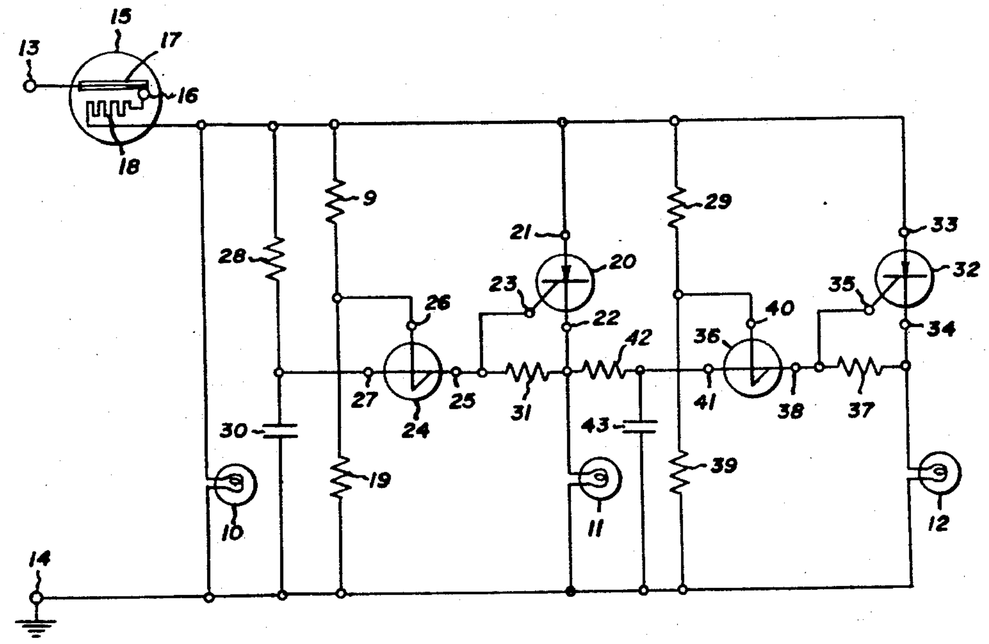
INVENTOR:
ABDULAHAT ADEM,
BY Urban H. Faubion
HIS ATTORNEY.

United States Patent Office 3,456,131
Patented July 15, 1969

3,456,131

SEQUENTIAL FLASHER CIRCUITS

Abdulahat Adem, Auburn, N.Y., assignor to General Electric Company, a corporation of New York Filed Dec. 28, 1966, Ser. No. 605,414
Int. Cl. H03k *17/26, 17/28*
U.S. Cl. 307—293 1 Claim

ABSTRACT OF THE DISCLOSURE

A circuit is provided for energizing two or more loads (e.g., lamps) sequentially and de-energizing all of the loads once all have been energized in order to start the sequential cycle over again which incorporates a series of parallel connected load normally open circuits which are connected across a supply terminal and a normally closed switch in the supply circuit which is opened in response to load current flowing through all of the parallel connected load circuits. A solid state switching means is provided which fires the first of the load current carrying solid state switches a predetermined time after energization at the circuit terminals and each subsequent loap (lamp) of the parallel connected load circuits in sequence of predetermined time after the preceding load circuit is rendered conductive thereby sequentially to render each of the load circuits conductive. The firing arrangement for each of the solid state switches incorporates solid state switches which are rendered conductive in response to the output of a voltage comparator circuit to render firing essentially independent of voltage level variations. Once all of the load circuits are conductive, they are all de-energized by the opening of the normally closed switch which closes again a predetermined time after opening in order to restart the firing cycle.

This invention relates to circuits of the type frequently referred to in the art as flashers or chaser circuits wherein a series of load devices (such as lamps) are energized in sequence with each load which is energized remaining energized until all loads are energized after which all loads are simultaneously de-energized and the cycle starts over again. Such circuits are useful in many applications including barricade flashes, rotating beacons, portable advertising signs and sequential turn signal systems for vehicles, etc.

The system specifically illustrated and described herein is a sequential turn signal for an automobile or other vehicle, however, it will be appreciated that other applications are within the contemplation of the present invention.

In general, known prior art circuits which perform the same general functions as those performed by the circuits of the present invention utilize mechanical switching arrangements which are subject to mechanical failures. Where solid state switches have been used in the past to avoid mechanical failures, highly elaborate circuits utilizing components which are relatively expensive have been used.

Accordingly, the present invention is directed to providing a solid state flasher circuit wherein highly reliable circuits and solid state circuit elements are used and a minimum number of circuit components are required.

Prior flasher circuits, while overcoming difficulties with mechanical switching arrangements and providing higher reliability, have other difficulties. For example, in copending Grafham application 605,415, filed Dec. 28, 1966, a solid state flasher or chaser circuit is disclosed wherein the silicon unilateral switch provides sequential firing of semiconductor controlled rectifiers which in turn each supply a load. However, the sequential firing is dependent upon operation of the silicon unilateral switches which in that context are fired in their anode to cathode voltage firing mode and consequently require from 6 to 8 volts to trigger them. Since many of the primary uses of such chaser circuits utilize batteries for operation, the voltage level at which the circuit is required to operate is uncertain. Therefore, some degree of uncertainty is involved where sequential operation is dependent upon voltage level.

Accordingly, it is an object of the present invention to provide chaser circuits which are essentially independent of voltage level.

In carrying out the present invention, a gate fired semiconductor switch is utilized to initiate sequencing of load energizing semiconductor switches and the gate fired switch has its anode to gate firing voltage supplied by a voltage comparator circuit in order to render the sequencing a function of voltage difference rather than a function of absolute voltage level in the circuit.

The novel features which are believed to be characteristic of the invention are set forth with particularity in the appended claims. The invention itself, however, both as to its organization and method of operation together with further objects and advantages thereof may best be understood by reference to the following description taken in connection with the accompanying drawing in which:

FIGURE 1 shows a schematic diagram of a circuit for sequentially energizing load circuits wherein each of the load circuits employ a solid state gate fired semiconductor switch and each of the switches is sequentially fired in response to signals from the output of semiconductor unilateral switches.

Referring specifically to the drawing, a schematic diagram of a flasher circuit of one embodiment of the invention is disclosed as it is used for turn signals of an automobile. In order to simplify the drawings and description, only the right rear turn signal lights 10, 11 and 12 are illustrated. The turn switches are not shown nor are the front signal light systems shown. It will be recognized that the system illustrated can be duplicated for the left side of the automobile and front turn lights can be used either as single lights or the flasher system illustrated for the right rear turn signal may be duplicated in the front of the automobile.

In order to indicate a right turn, the inboard lamp 10 is first energized, then center lamp 11 is energized and next lamp 12 is energized. Once all three lamps are energized, a means is provided to de-energize all three and start the sequence again. Thus, a flashing arrow is simulated.

Power for the circuit illustrated is applied between input terminals 13 and 14 which represent the positive DC power supply and ground terminal 14 respectively. The means for resetting the system, that is, for disconnecting all of the lamps from the power source once all three lamps are energized comprises, in the embodiment illustrated, a conventional thermal flasher switch 15 which is normally closed. Flasher switch 15 has a contact 16 which is normally contacted by a conductive bimetal element 17 to complete the circuit. In order to provide for opening switch 15 a heater element 18 is positioned adjacent bimetal 17 and connected in series circuit relation with switch contact 16. Heating element 18 normally only generates enough heat to cause the bimetal element 17 to deform and open the circuit after a period of time which is sufficient for all three of the sequentially energized signal lamps 10, 11 and 12 to become energized. After a period with all three lamps 10, 11 and 12 on, the thermal flasher opens, power is removed from the circuit and the lamps are extinguished. With the thermal flasher switch 15 open, heater 18 is no longer energized and the bimetal element 17 again closes on contact 16 again to apply power to the circuit and repeat the sequence.

It will be noted that the first lamp circuit (load circuit) only contains inboard lamp 10 connected directly across the input terminals 13 and 14 in series with the thermal flasher switch 15. Thus, inboard lamp 10 is energized whenever power is applied to input terminals 13 and 14 and thermal flasher switch 15 is closed.

In order to provide a means for center lamp 11 to be in a de-energized condition while inboard lamp 10 is energized a solid state switch 20 is provided in series with the center lamp and this center lamp circuit is connected in parallel with inboard lamp 10 across power input terminals 13 and 14. As illustrated, the solid state switch 20 in series with lamp 11 is of the type known in the art as a semiconductor controlled rectifier (SCR) which has an anode terminal 21, cathode terminal 22 and a gate terminal 23. Details of the operation of the SCR are not described here since its operation is well known in the art, and it is described in many publications. It should suffice to say that the SCR is normally in a high impedance state (essentially non-conducting) and can be fired or rendered conductive by application of the proper signal at the gate terminal 23.

As illustrated, in order to fire SCR 20 and energize the series circuit of center lamp 11, a silicon unilateral switch 24 is utilized. The silicon unilateral switch 24 is provided with cathode, gate and anode terminals 25, 26 and 27 respectively. Since the silicon unilateral switch is described in detail in the literature (see the article entitled "Using the Silicon Bilateral/Unilateral Switch" by Robert Muth which appears in the March 1966 issue of E.E.E. magazine, pp. 78 through 85, it is not described in detail here. However, functionally the unilateral switch appears as an open circuit until fired in one of two ways, then it becomes highly conductive. One way to render the silicon unilateral switch conductive is to provide a voltage of between 6 and 8 volts between anode and cathode terminals 27 and 25 respectively (positive voltage at the anode). This firing mode is not used here. The gate firing mode entails rendering both gate and anode terminals 26 and 27 positive relative to cathode terminal 25 and anode terminal more positive than gate terminal by about 0.4 volts. In order to provide a voltage comparator firing arrangement for silicon unilateral switch 24 which renders its firing level (and the sequential firing operation) essentially independent of supply voltage level a series circuit comprising a resistor 28 and capacitor 30 and a voltage divider comprising series connected resistors 9 and 19 are connected in parallel with each other and across supply terminals 13 and 14.

Silicon unilateral switch 24 has its cathode terminal 25 connected directly to gate electrode 23 of SCR 20, its anode terminal 27 connected at the junction between resistor 28 and capacitor 30 and its gate terminal 26 connected to the voltage divider circuit between resistor 9 and 19. Thus, the voltage between anode and gate terminals 27 and 26 is the output of the voltage comparator arrangement. Thus, in this instance when capacitor 30 charges up through resistor 28 to a value which is more than about 0.4 volt higher than the voltage between resistors 9 and 19, switch 24 becomes conductive and thereby applies a firing current to the gate terminal 23 of SCR 20 which then causes the SCR to become conductive and center lamp 11 to become energized. Notice here that the firing voltage is not dependent upon the magnitude of line voltage but only upon the difference voltage of the comparator circuit.

Approximately the same kind of circuit voltage independent firing arrangement is provided for SCR 32 in the outboard lamp energizing circuit. That is, another silicon unilateral switch 36 which has anode, cathode, and gate terminals 41, 38 and 40 respectively is provided. In addition, a voltage comparator firing circuit is provided for silicon unilateral switch 36. This voltage comparator circuit includes the series combination of resistor 42 and capacitor 43 which are connected across center lamp 11 and also the series circuit composed of resistors 29 and 39 which are connected between positive and negative circuit terminals 13 and 14.

The silicon unilateral switch 36 has its anode terminal 41 connected between resistor 42 and capacitor 43 and its gate terminal 40 connected between resistors 29 and 39 of the voltage divider so that the switch is fired in response to the differential voltage between these two series circuits which form a voltage comparator. The cathode terminal 38 of silicon unilateral which is connected directly to the gate electrode 35 of SCR 32.

Thus, a period of time after center lamp 11 is energized, capacitor 41 becomes charged to a value approximately 0.4 volts higher than the gate of silicon unilateral switch 36 which fires the silicon unilateral switch 36. In turn, SCR 32 is fired thereby to energize outboard lamp 12.

Thus, it is seen that lamps 10, 11 and 12 are sequentially fired in time sequence. Since the thermal flasher 15 is in the circuit it opens and closes as described previously to reset the circuit and provide for repeated sequential energization of the lamps.

Thus, it is seen that the objects have been carried out by providing a circuit for repetitively sequentially energizing a number of load devices wherein the sequencing operation is independent of supply voltage level.

While particular embodiments of the invention have been shown, it will, of course, be understood that the invention is not limited thereto since many modifications in the circuit arrangements and in the instrumentalities employed may be made. It is contemplated by the appended claims to cover any such modifications as fall within the true spirit and scope of the invention.

What I claim as new and desire to secure by Letters Patent of the United States is:

1. A circuit for repetitively energizing more than one load device sequentially and de-energizing the load devices after all are energized including in combination, a pair of supply terminals for connection to a supply source, at least two load circuits each connected between said supply terminals and in parallel with each other for energization by a voltage supplied across said terminals, a normally conductive load current responsive switch means connected in series with all of said parallel connected load circuits, said load current responsive switch means responsive to energy supplied to said load circuits to open when all said load circuits are energized at one time thereby to disconnect said load circuits from said source and to close again a predetermined time after load current ceases to flow in said load circuits thereby to reset said system, first and second normally non-conducting solid state switch means each having anode, cathode and gate electrodes, said gate electrodes being provided for the purpose of rendering said solid state switch means conductive upon application of a gate firing current, said anode and cathode electrodes each of said solid state switch means connected in series circuit relation in said first and second load circuits respectively whereby each said first and second load circuits are normally non-conductive and can be effectively rendered conductive by rendering the respective solid state switch means conductive, first and second biasing resistors each connected between the gate and cathode electrodes of said first and second solid state switch means respectively, and a first series circuit comprising a resistor and capacitor connected in parallel with said first load circuit, a first voltage divider connected in parallel with said first load circuit, a first normally non-conductive semiconductor unilateral switch having anode, cathode, and gate firing terminals, said first semiconductor unilateral switch having its anode terminal connected to said first series circuit at the juncture between the resistor and capacitor, its cathode terminal connected to the gate electrode of said first semiconductor switch means whereby conduction of said semiconductor unilateral switch causes said first semiconductor switch to be rendered conductive and the gate terminal of said semiconductor unilateral switch being connected to a point on the voltage divider to determine firing voltage of said semiconductor unilateral switch, a second series circuit comprising a second resistor and a second capacitor connected across the load in said first load circuit whereby a voltage is developed across said second series circuit only when said first load circuit is rendered conductive, a second voltage divider circuit connected in parallel with said second load circuit, a second semiconductor unilateral switch having anode, cathode and gate terminals, the anode terminal of said second semiconductor unilateral switch connected to the said second series circuit at the juncture between said resistor and capacitor, the gate terminal of said second semiconductor unilateral switch connected to the said second voltage divider circuit to determine the switch firing voltage, the cathode terminal of said second semiconductor unilateral switch connected to the gate terminal of said second semiconductor solid state switch means whereby said second solid state switch means is rendered conductive a predetermined time after said first load circuit is rendered conductive and whereupon all said load circuits are energized and said load current responsive switch disconnects all of said load circuits thereby to start a new cycle.

References Cited

UNITED STATES PATENTS 3,162,772 12/1964 Smith ---------------- 307—293

ARTHUR GAUSS, Primary Examiner

B. P. DAVIS, Assistant Examiner

U.S. Cl. X.R.

307—301, 305, 252; 315—200, 323; 340—82